(12) United States Patent
Sakai (10) Patent No.: US 8,149,320 B2
(45) Date of Patent: Apr. 3, 2012

(54) SHOOTING OPTICAL SYSTEM

(75) Inventor: Mikio Sakai, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 12/467,301

(22) Filed: May 17, 2009

(65) Prior Publication Data

US 2009/0284640 A1 Nov. 19, 2009

(30) Foreign Application Priority Data

May 19, 2008 (JP) .................................. 2008-130619

(51) Int. Cl.
*G02B 13/16* (2006.01)
*H04N 5/225* (2006.01)

(52) U.S. Cl. ........................................ 348/335; 348/374

(58) Field of Classification Search .................. 348/335, 348/345, 374

See application file for complete search history.

(56) References Cited

U.S. PATENT DOCUMENTS

| | | | |
|---|---|---|---|
| 5,262,898 A * | 11/1993 | Nomura ......................... | 359/700 |
| 5,764,290 A * | 6/1998 | Hirota et al. ................ | 348/240.3 |
| 6,271,882 B1 * | 8/2001 | Kawamura et al. ........... | 348/335 |
| 2007/0217029 A1 * | 9/2007 | Kato ............................. | 359/694 |

FOREIGN PATENT DOCUMENTS

| | | |
|---|---|---|
| JP | H10-020179 A | 1/1998 |
| JP | H10-153732 A | 6/1998 |

* cited by examiner

*Primary Examiner* — Jordan Schwartz
(74) *Attorney, Agent, or Firm* — Canon U.S.A., Inc. IP Division (57) ABSTRACT

A shooting optical system for performing flange back adjustment by moving a lens unit included in the shooting optical system in an optical axis direction includes: a drive gear engaging a lens holding frame for holding the lens unit; a drive unit for rotating the drive gear; a first gear rotating relatively to the drive gear; an operation unit for the flange back adjustment, for rotating the first gear; a detection unit for detecting a relative positional relationship between the first gear and the drive gear; and a control unit for driving the drive unit so as to rotate the drive gear based on a detection signal detected by the detection unit, thereby moving the lens holding frame in the optical axis direction so that the flange back adjustment is performed.

12 Claims, 7 Drawing Sheets

SHOOTING OPTICAL SYSTEM

BACKGROUND OF THE INVENTION

1. Field of the Invention

The present invention relates to a shooting optical system for controlling a position of a lens unit constituting the shooting optical system to be a predetermined position in an optical axis direction to perform flange back adjustment. For instance, the present invention relates to the shooting optical system that is suitable for a video camera or a television camera.

2. Description of the Related Art

Conventionally, a zoom lens (shooting optical system) used in a broadcasting camera (TV camera) is provided with a macro mechanism that enables shooting a close object.

For instance, a lens unit included in a relay optical system (in a master lens unit) is moved to a macro shooting position based on a macro control signal from a macro control signal generation unit so that the macro shooting is performed.

In addition, many zoom lenses for a TV camera are provided with a flange back adjustment (tracking adjustment) mechanism for adjusting so that an image is formed on the image pickup element. This flange back adjustment is performed by moving the lens unit included in the relay optical system that is the same lens unit moved for the macro shooting based on a flange back control signal from a flange back control signal generation unit.

There is known a zoom lens that performs the above-mentioned operations by selecting each of the operations in accordance with operation of a selection switch (see Japanese Patent Application Laid-Open No. H10-153732).

As described above, the conventional zoom lens for a TV camera is provided with a flange back control signal (hereinafter, referred to as a flange back operating control signal) generation unit for flange back adjustment and the macro control signal generation unit for macro shooting.

Thus, a position of some of the lens units of the relay optical system is instructed by the flange back operating control signal when the flange back adjustment is performed, and instructed and controlled by the macro control signal when the macro shooting is performed.

The conventional zoom lens for a TV camera needs the flange back control signal generation unit, the macro control signal generation unit, and a switching unit or an adding unit for the signals. Therefore, the circuit scale is apt to increase. In addition, the flange back position is controlled by the flange back control signal, and hence a compensation circuit is also necessary for compensating for environmental variation such as temperature variation. In addition, a mechanical movement amount for the flange back adjustment is different for each type of the TV camera, and hence adjustment is necessary for each type thereof for matching an entire range of the flange back control signal generation unit with a moving range of a relay lens. Therefore, the circuit structure is apt to be complicated.

SUMMARY OF THE INVENTION

According to one aspect of the present invention, there is provided a shooting optical system for performing flange back adjustment by moving a lens unit included in the shooting optical system in an optical axis direction, comprising: a drive gear engaging a lens holding frame for holding the lens unit; a drive unit for rotating the drive gear; a first gear rotating relatively to the drive gear; an operation unit for the flange back adjustment, for rotating the first gear; a detection unit for detecting a relative positional relationship between the first gear and the drive gear; and a control unit for driving the drive unit so as to rotate the drive gear based on a detection signal detected by the detection unit, thereby moving the lens holding frame in the optical axis direction so that the flange back adjustment is performed.

In the shooting optical system according to the one aspect of the present invention, the control unit drives the drive unit so as to rotate the drive gear until a relative angle between the first gear and the drive gear, which is detected by the detection unit, becomes a predetermined value or smaller.

In the shooting optical system according to the one aspect of the present invention, the control unit drives the drive unit so as to rotate the drive gear based on a macro control signal concerning macro shooting from a macro shooting controller for delivering the macro control signal, thereby moving the lens holding frame in the optical axis direction so that the macro shooting is performed.

In the shooting optical system according to the one aspect of the present invention, the first gear does not rotate when the drive unit is being driven so as to rotate the drive gear based on the macro control signal.

In the shooting optical system according to the one aspect of the present invention, the control unit drives the drive unit so as to rotate the drive gear based on a control signal concerning finishing of the macro shooting, thereby resetting the lens holding frame to a position after the flange back adjustment.

Further, according to another aspect of the present invention, there is provided an image pickup apparatus comprising the above-mentioned shooting optical system.

Further features of the present invention become apparent from the following description of exemplary embodiments with reference to the attached drawings.

DESCRIPTION OF THE EMBODIMENTS

Hereinafter, an embodiment mode of the present invention will be described in detail with respect to the attached drawings.

An object of the embodiment of the present invention is to provide a shooting optical system for selecting and performing the flange back adjustment and the macro shooting with a simple structure.

The shooting optical system according to the embodiment of the present invention is a television lens for a television camera system, for example. The shooting optical system is a zoom lens including a focus lens unit, a zoom lens unit, and a relay lens unit (relay lens) disposed in the stated order from the front side (object side).

The lens unit included in the shooting optical system, e.g., the lens unit included in the relay lens unit is moved in the optical axis direction so that the flange back adjustment or the macro shooting is performed.

Further, the shooting optical system according to the embodiment of the present invention includes a drive gear engaging with a lens holding frame (lens barrel) for holding the lens unit, a drive unit such as a motor for rotating the drive gear, and a first gear (slip gear) engaging with the drive gear in a rotatable (rotationally slidable) manner so as to rotate relatively to the drive gear.

When the flange back adjustment is performed, the first gear is rotated by a torque from an operation system as a flange back adjustment knob.

In this case, a relative positional relationship (relative angle) between the first gear and the drive gear is detected by a detection unit such as an angle detector (e.g., rotary encoder).

Further, the drive unit is driven by the control unit (control circuit) based on a detection signal from the detection unit (signal detected by the detection unit) so that the drive gear is rotated. Thus, the lens holding frame is controlled to move in the optical axis direction.

In addition, when the macro shooting is performed, a macro shooting switch constituting a part of a macro shooting unit is turned on.

The control unit receives a macro control signal concerning the macro shooting from a macro shooting controller constituting a part of the macro shooting unit. Further, the control unit causes the drive unit to drive the lens holding frame to move in the optical axis direction based on the macro control signal.

Further, the macro shooting switch is turned off when the macro shooting is finished.

Then, the control unit receives a signal indicating that the macro shooting is finished. Based on an offset control signal concerning the finishing of the macro shooting, the control unit causes the drive unit to drive the lens holding frame to move forcedly to an original position after the flange back adjustment.

According to the embodiment of the present invention, it is possible to obtain the shooting optical system that can select and perform the flange back adjustment and the macro shooting with a simple structure.

Figure 1:
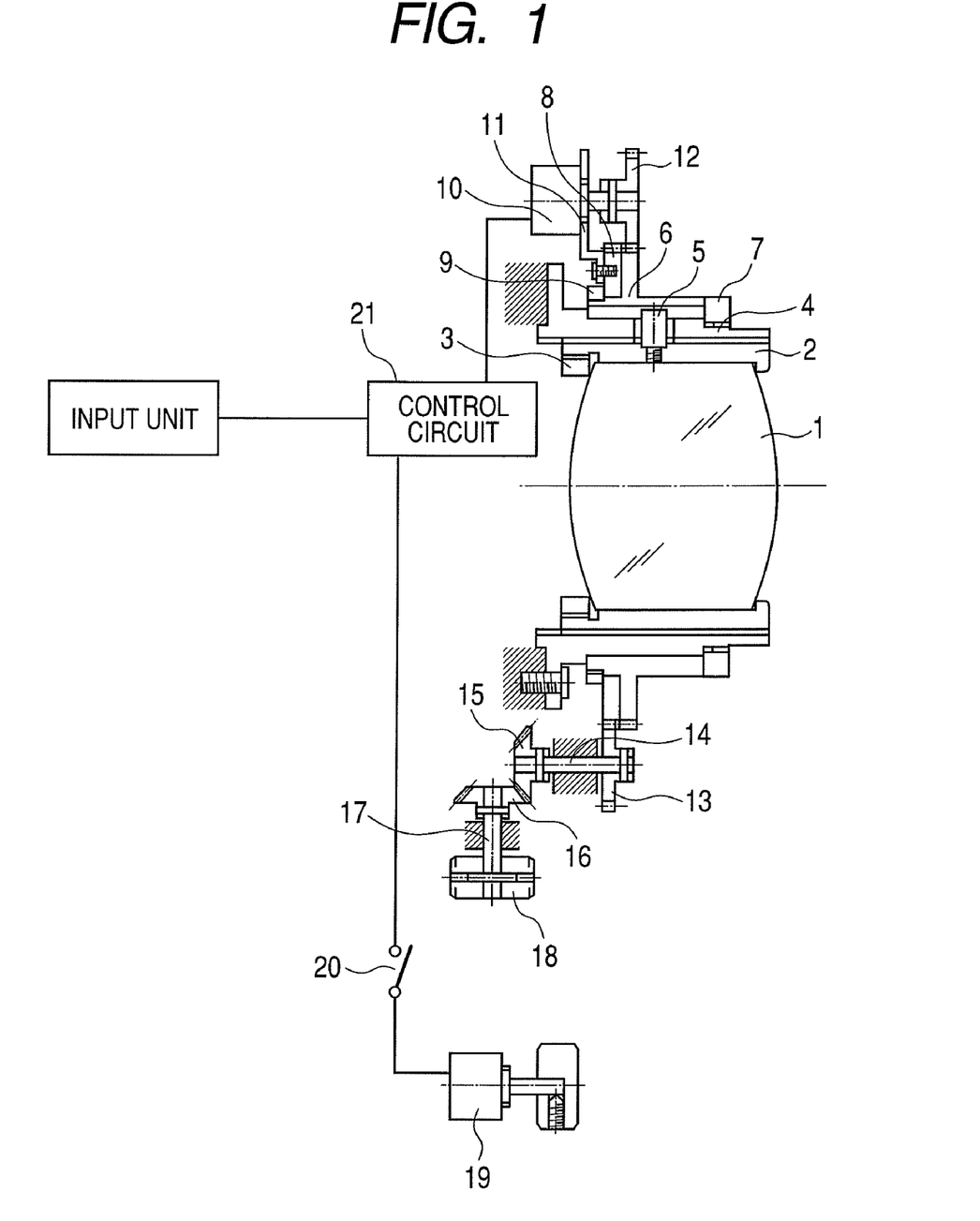
FIG. 1 is a cross sectional view of a main part in Embodiment 1 of the present invention (cross section cut along the line 1-1 of FIG. 3).
Figure 3:
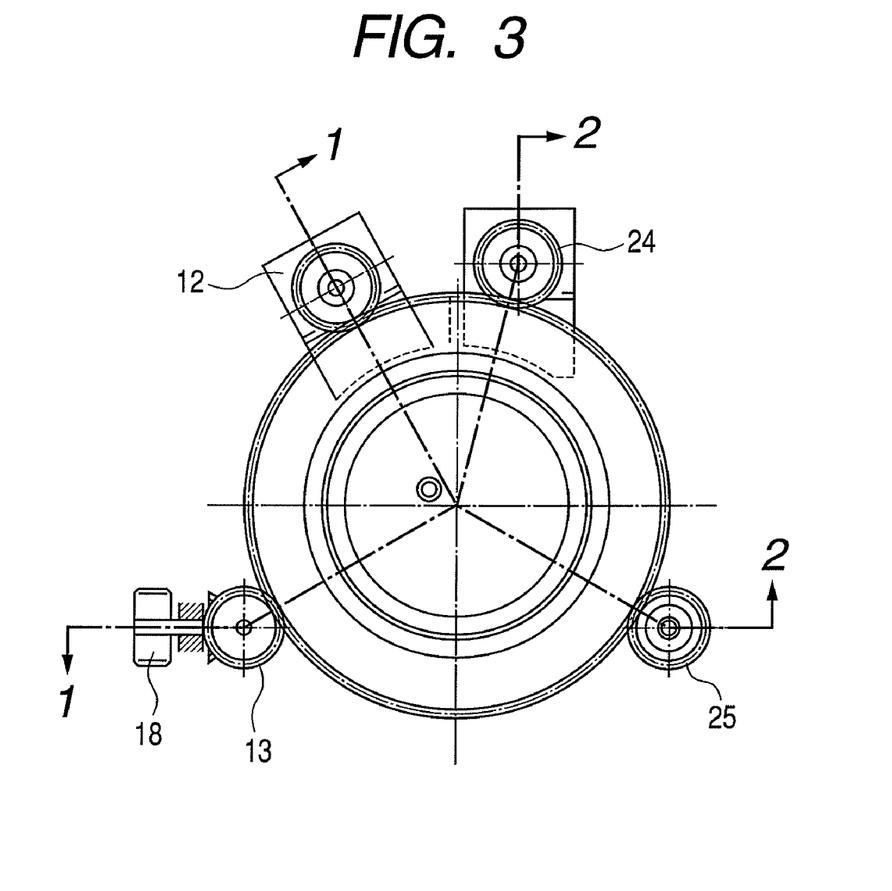
FIG. 3 is a side view of Embodiment 1 of the present invention.
Figure 8:
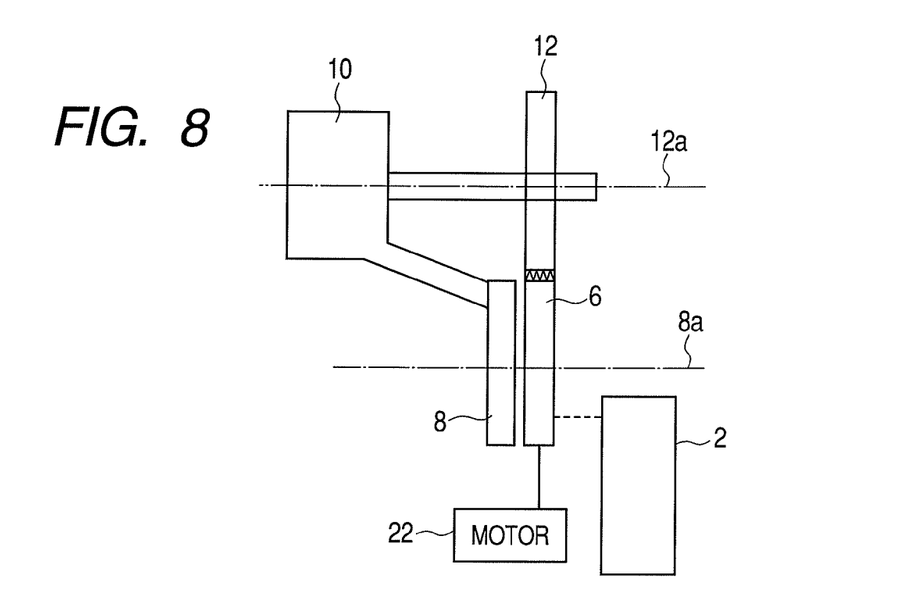
FIG. 8 is a schematic diagram of a part of FIG. 1.

FIG. 1 is a schematic diagram of a main part in Embodiment 1 of the present invention. FIG. 8 is a schematic diagram of a part of FIG. 1. FIG. 3 is a side view of FIG. 1. In FIGS. 1 and 3, a lens unit 1 includes the entire or a part of a relay lens system. A lens barrel (lens holding frame) 2 has feed screw threads on the outer surface thereof and moves the lens unit 1 back and forth in the optical axis direction. A press ring 3 fixes the lens unit 1 to the inside of the lens barrel 2. A lens barrel 4 has feed screw threads on the inner surface thereof and engages with the lens barrel 2. The lens barrel 4 is fixed to a lens main body (not shown). A pin 5 is fixed to the lens barrel 2 and rotates the lens barrel 2. A drive gear 6 protrudes from a groove provided to the lens barrel 4 and engages with the pin 5 fixed to the lens barrel 2 through a key way, thereby driving the lens barrel 2.

A press ring 7 restricts movement of the drive gear 6 in the thrust direction. A slip gear (first gear) 8 engages with the drive gear 6 in a rotationally slidable manner and rotates relatively to the drive gear 6. A press ring 9 restricts movement of the slip gear 8 in the thrust direction. An angle detector (detection unit) 10 such as a rotary encoder detects a relative angle between the drive gear 6 and the slip gear 8. An attachment member 11 attaches the angle detector 10 to the slip gear 8. A gear (transmission gear) 12 transmits rotation of the drive gear 6 to the angle detector 10. A flange back adjustment knob 18 constitutes a part of a flange back adjustment unit and transmits an operating force to the slip gear 8 via shafts 14 and 17 of gears 13, 15, and 16.

Note that the shaft 17 is locked by a lock mechanism (not shown) after the flange back is set, so as not to rotate uselessly.

Figure 2:
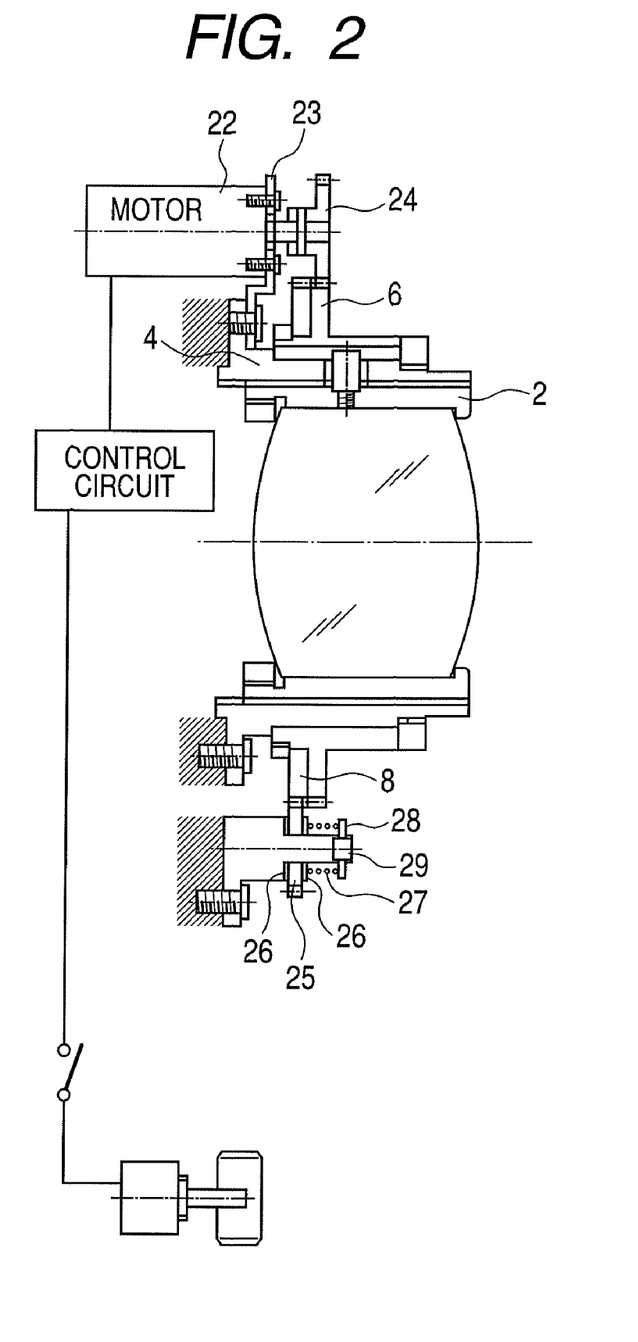
FIG. 2 is a cross sectional view of a main part in Embodiment 1 of the present invention (cross section cut along the line 2-2 of FIG. 3).

A macro shooting controller 19 and a macro shooting switch 20 for switching whether or not to perform the macro shooting constitute the macro shooting unit. A control circuit (control unit) 21 controls various operations. FIG. 2 is a schematic diagram illustrating a cross section cut along the line 2-2 of FIG. 3.

In FIG. 2, a motor 22 serves as a drive unit and is fixed to the lens barrel 4 with an attachment member 23. A gear (transmission gear) 24 transmits a drive force of the motor 22 to the drive gear 6. There are also provided a gear 25, a friction member 26, a bias unit 27 such as a spring, a nut 28 for adjusting a bias force 27 of the spring, and a fixed shaft 29.

The gear 25 is supplied with a break torque from the friction member 26 and the bias unit 27 and is connected to the slip gear 8 so that the break torque is supplied to the slip gear 8. Thus, it is prevented that rotation of the drive gear 6 causes rotation of the slip gear 8 in a backlash range.

Next, an operation of this embodiment is described with reference to a flowchart illustrated in FIG. 4 and FIG. 8 that is a schematic diagram illustrating a part of the main part extracted from FIG. 1. First, the flange back adjustment is described.

The flange back (F.B.) adjustment knob (operation unit or flange back adjustment unit) 18 is operated to rotate so that the slip gear (first gear) 8 is rotated about a rotation axis 8a.

When the slip gear 8 rotates, the angle detector 10 mounted on the slip gear 8 turns around the axis 8a as a planetary rotation (revolution).

In addition, the gear 12 for transmitting the rotation to the angle detector 10 is also rotated about the rotation axis 12a at the same time. Further, the gear 12 engages with the drive gear 6, and hence the gear 12 turns around the drive gear 6 (as revolution) while rotating about the axis 12a.

On this occasion, the angle detector 10 detects the relative angle between the first gear 8 and the drive gear 6. The control unit 21 controls the motor (drive unit) 22 to drive and rotate the drive gear 6 via the transmission gear 24 based on the relative angle (detection signal) between the first gear 8 and the drive gear 6 detected by the angle detector 10. Further, the drive gear 6 is rotated until a relative angle difference between the first gear 8 and the drive gear 6 decreases to be a predetermined value or smaller.

When the drive gear 6 rotates, the lens barrel 2 holding the lens unit 1 moves in the optical axis direction. If the relative angle difference is larger than the predetermined value, the lens barrel 2 is driven. When the relative angle difference decreases to be the predetermined value or smaller, the flange back adjustment is finished.

If the predetermined value is very small, the first gear 8 and the drive gear 6 rotate as if they were a single member, and act similarly to the case where the drive gear 6 is rotated by the flange back adjustment knob 18.

Thus, the lens unit 1 moves back and forth in the optical axis direction, whereby the flange back adjustment can be performed.

Next, if the macro shooting switch (macro control signal generation unit or macro demand) 20 is turned on, the control circuit 21 obtains a command value of the macro control signal by the macro shooting controller 19.

Next, the command value is compared with a position of the lens unit 1 in the optical axis direction. Then, the drive gear 6 is rotated by the motor (drive unit) 22 via the transmission gear 24 until the position of the lens unit 1 becomes equal to the command value. By the back and forth movement of the lens unit 1 in the optical axis direction, the macro shooting can be performed with a remote controller.

On this occasion, a rotation angle of the drive gear 6 is detected by the angle detector (position detector) 10.

When the macro shooting is finished, the switch 20 is turned off so that the control circuit 21 controls the motor 22 based on the offset control signal to drive the lens unit 1 to move forcedly to an original position after the previous flange back adjustment.

As described above, the shooting optical system of this embodiment rotates the first gear 8 engaging the drive gear 6 in a rotatable (rotationally slidable) manner by the operating force (rotation force) from the flange back adjustment unit 18 when the flange back adjustment is performed.

On this occasion, the angle detector 10 provided to the first gear 8 detects the relative angle between the drive gear 6 and the first gear 8. Based on a signal from the angle detector 10 (result of the detection), the control unit 21 supplies a drive signal to the drive unit 22. The drive unit 22 rotates the drive gear 6 via the transmission gear 24 based on the supplied drive signal. Thus, the lens holding frame 2 is driven to move in the optical axis direction.

On this occasion, the control unit 21 rotates the drive gear 6 until the relative angle between the first gear 8 and the drive gear 6, which is detected by the angle detector 10, decreases to be the predetermined value or smaller.

Thus, the flange back adjustment is performed.

Next, when the macro shooting is performed, the macro shooting switch is turned on. Then, the control unit 21 controls the drive unit 22 based on the macro control signal from the macro shooting controller 19 to drive the lens holding frame 2 to move back and forth in the optical axis direction. Thus, the macro shooting is performed.

Next, in order to finish the macro shooting, the macro shooting switch 20 is turned off. On this occasion, the control unit 21 controls the lens holding frame 2 based on the offset control signal to move forcedly to the position after the flange back adjustment is performed. Thus, the macro shooting is finished.

As described above, this embodiment includes at least one macro control signal generation unit 20, a position detector 10 for detecting a position of the lens unit 1 in the optical axis direction, the drive unit 22 for driving the lens unit 1, and an operating force input unit 18 for the flange back adjustment. Thus, the flange back adjustment and the macro shooting with a remote control are realized easily.

Figure 4:
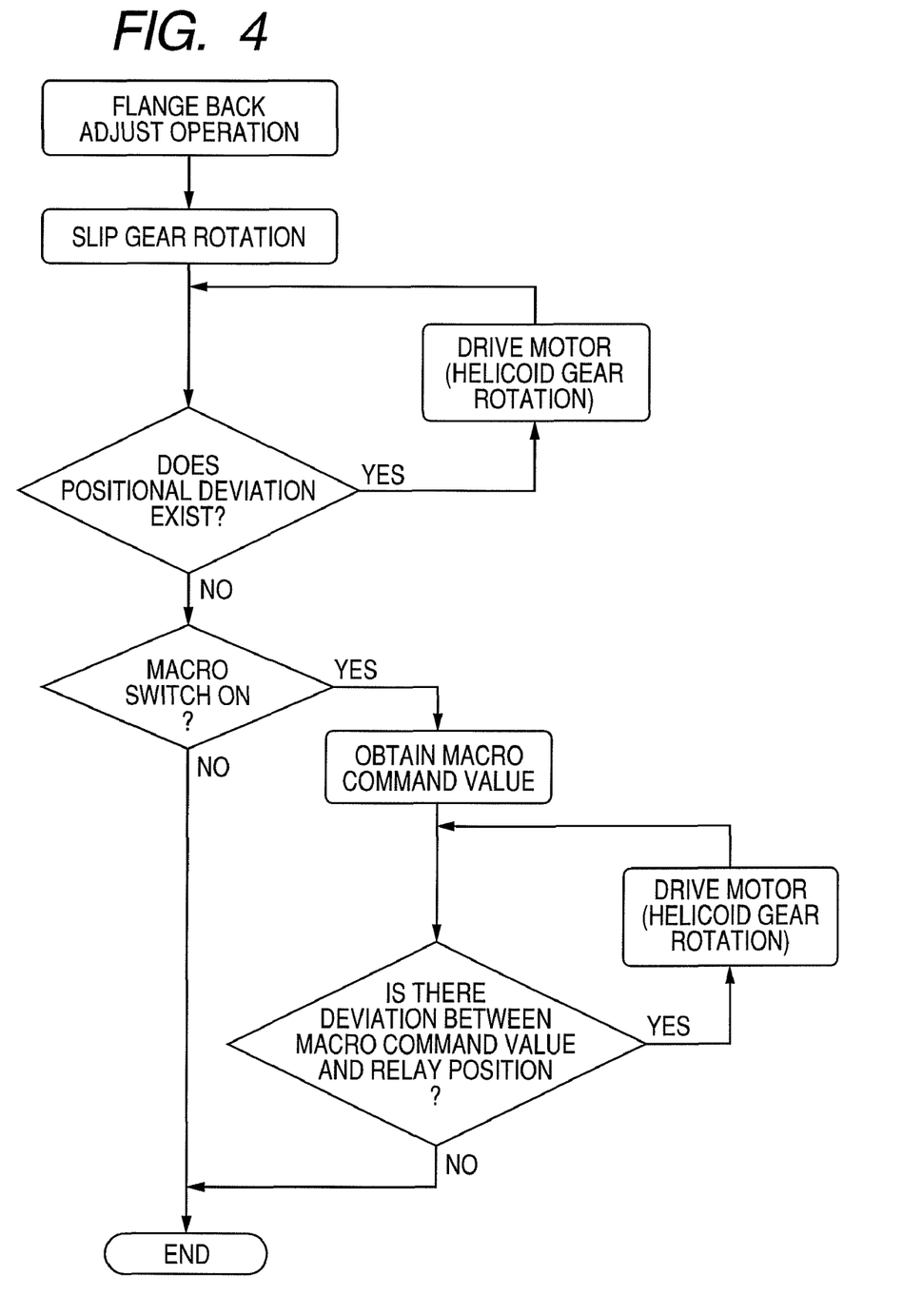
FIG. 4 is a flowchart illustrating an operation of Embodiment 1 of the present invention.

The macro operation is performed after the flange back adjustment according to the flowchart of FIG. 4, but it is possible to adopt a usage in which the flange back is operated after the macro operation or simultaneously in order to obtain more macro effect.

Figure 5:
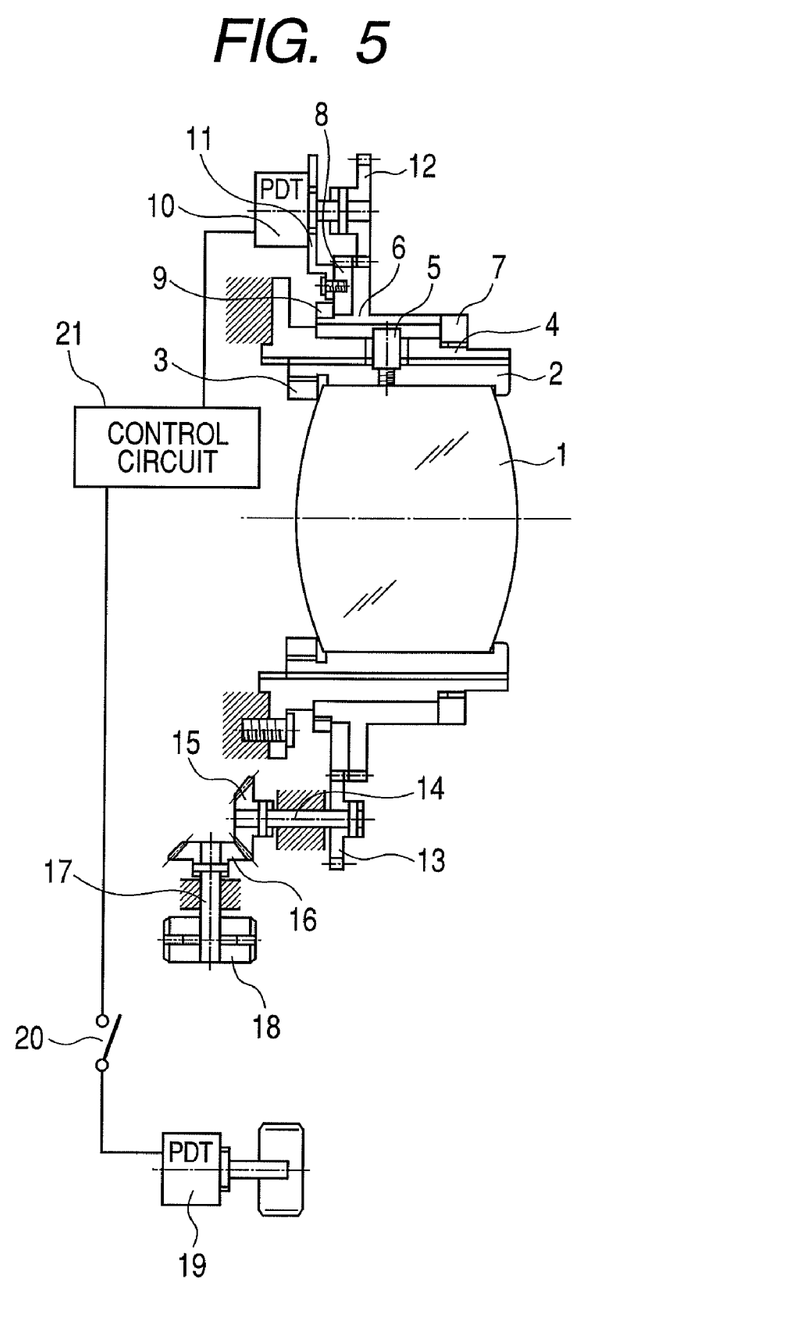
FIG. 5 is a cross sectional view of a main part in Embodiment 2 of the present invention (cross section cut along the line 5-5 of FIG. 7).
Figure 6:
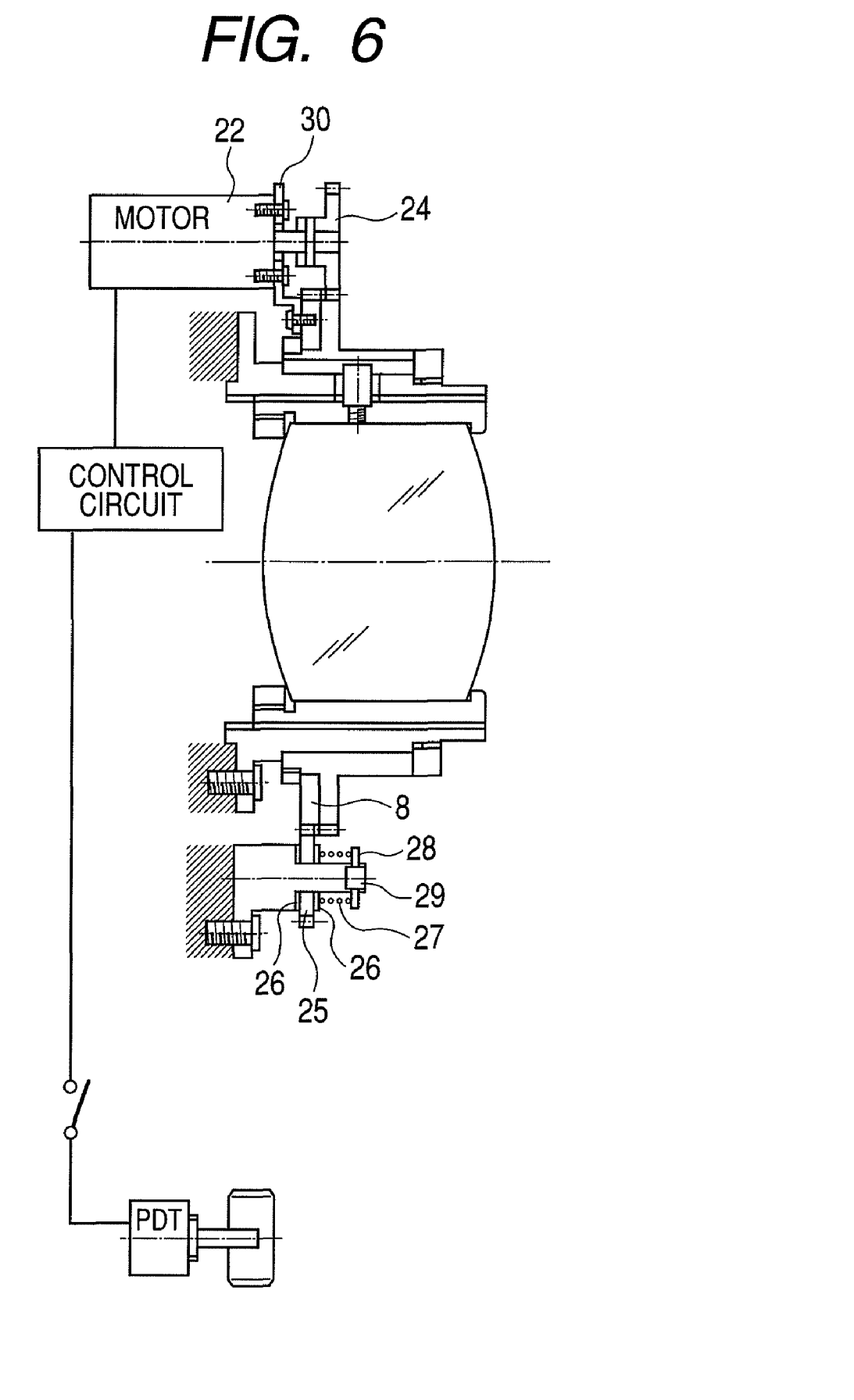
FIG. 6 is a cross sectional view of a main part in Embodiment 2 of the present invention (cross section cut along the line 6-6 of FIG. 7).
Figure 7:
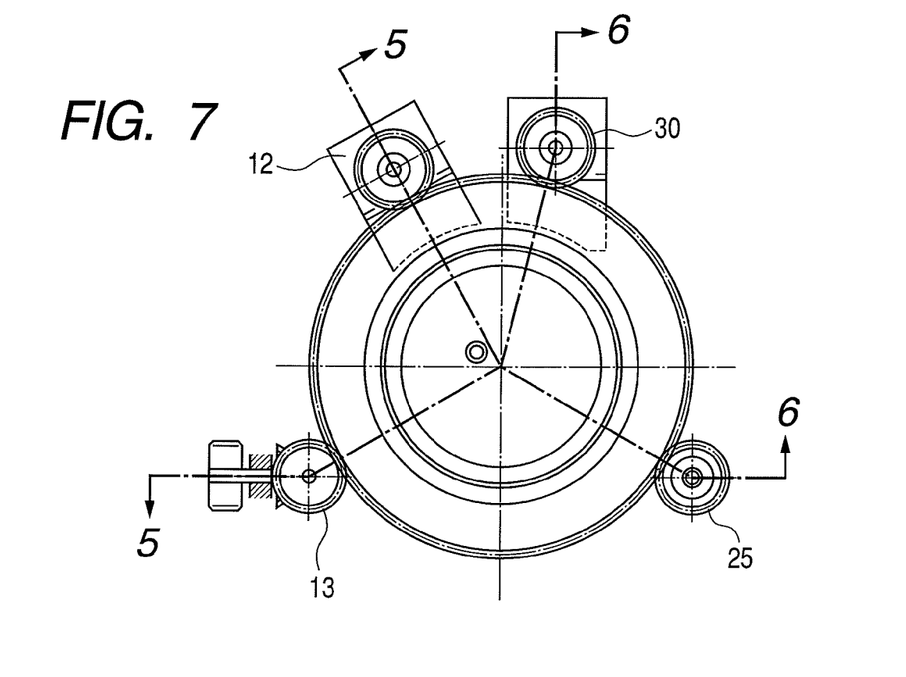
FIG. 7 is a side view of Embodiment 2 of the present invention.

FIGS. 5 and 6 are schematic diagrams of a main part of Embodiment 2 according to the present invention. FIG. 7 is a side view of FIG. 5. In FIGS. 5 to 7, the same reference numeral denotes the same member as that of Embodiment 1 so that overlapping description of the same member is omitted. In FIG. 6, a motor attachment member 30 is fixed to the slip gear (first gear) 8.

According to this structure, the motor 22 turns around the optical axis together with the slip gear 8 when the flange back adjustment is performed. Therefore, a rotation amount of the drive gear 6 that the motor 22 should drive corresponds to only the relative angle between the slip gear 8 and the drive gear 6.

On the other hand, a drive amount by the motor necessary in Embodiment 1 corresponds to the "rotation angle of the slip gear 8" plus the "relative angle between the slip gear 8 and the drive gear 6". Therefore, Embodiment 2 has effects of improving a tracking performance and reducing power consumption because of smaller drive amount compared with Embodiment 1.

Exemplary embodiments of the present invention are described above. It is needless to say that the present invention is not limited to those embodiments and that various modifications and changes are possible within the scope of the present invention.

The two embodiments described above exemplify the case where the macro shooting is performed. The present invention is not limited to this case. It is possible to supply a constant value of the control signal to the control unit 21 for shooting with infrared light from an external input unit instead of the macro control signal. Thus, the control unit 21 may change the position of the lens holding frame 2 in the optical axis direction, which is adjusted in the flange back adjustment, so as to move the same to a position on the optical axis, which is preset based on an input signal. Thus, it is possible to switch as a shooting lens that is applied to a wavelength other than visible light (i.e., infrared light).

As described above, according to the respective embodiments, the macro shooting and the flange back adjustment can be performed without using "the flange back control signal generation unit" and "the switching unit or the adding unit of the flange back control signal and the macro control signal", whereby the circuit can be simplified.

The flange back control signal is needless, and hence a deviation of the flange back due to a temperature variation does not occur. Therefore, the circuit for compensating for the deviation of the flange back becomes needless.

A mechanical movement amount for the flange back adjustment differs for each type of the zoom lens. Therefore, the conventional structure needs adjustment for matching the entire range of the flange back control signal generation unit (upper limit and lower limit of a command signal of a potentiometer) with the moving range of the relay lens for each type. On the contrary, the adjustment is needless in the present invention because a movement amount of the relay lens is determined by a mechanical range of the flange back knob.

Therefore, the circuits and the adjustment step become needless, whereby the entire apparatus can be simplified.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-130619, filed May 19, 2008, which is hereby incorporated by reference herein in its entirety.

What is claimed is:

1. A camera optical system for performing flange back adjustment by moving a lens unit included in the camera optical system in an optical axis direction, the camera optical system comprising:
   a drive gear engaging a lens holding frame for holding the lens unit;
   a drive unit for rotating the drive gear;
   a first gear not interlocked with the rotation of the drive gear driven by the drive unit;
   an operation unit for the flange back adjustment, for rotating the first gear;
   a detection unit for detecting a relative positional relationship between the first gear and the drive gear; and
   a control unit for driving the drive unit so as to rotate the drive gear based on the positional relationship detected by the detection unit, thereby moving the lens holding frame in the optical axis direction so that the flange back adjustment is performing and then moving the lens to a position where the flange back adjustment was performed.

2. A camera optical system according to claim 1, wherein the control unit drives the drive unit so as to rotate the drive gear until a relative angle between the first gear and the drive gear, which is detected by the detection unit, becomes a predetermined value or smaller.

3. A camera optical system according to claim 2, wherein the control unit drives the drive unit so as to rotate the drive gear based on a macro control signal concerning macro shooting from a macro shooting controller for delivering the macro control signal, thereby moving the lens holding frame in the optical axis direction so that the macro shooting is performed.

4. A camera optical system according to claim 3, wherein the first gear does not rotate when the drive unit is being driven so as to rotate the drive gear based on the macro control signal.

5. A camera optical system according to claim 4, wherein the control unit drives the drive unit so as to rotate the drive gear based on a control signal concerning finishing of the macro shooting, thereby moving the lens holding frame in the optical axis direction to move the lens to the position where the flange back adjustment was performed.

6. An image pickup apparatus comprising the camera optical system according to claim 1.

7. A camera optical system for performing flange back adjustment by moving a lens unit included in the camera optical system in an optical axis direction, the camera optical system comprising:
   a drive gear engaging a lens holding frame for holding the lens unit;
   a drive unit for rotating the drive gear;
   a first gear not interlocked with the rotation of the drive gear driven by the drive unit;
   an operation unit for the flange back adjustment, for rotating the first gear;
   a detection unit for detecting a relative positional relationship between the first gear and the drive gear; and
   a control unit for driving the drive unit so as to rotate the drive gear based on the positional relationship detected by the detection unit, thereby moving the lens holding frame in the optical axis direction so that the flange back adjustment is performed.

8. A camera optical system according to claim 7, wherein the control unit drives the drive unit so as to rotate the drive gear until a relative angle between the first gear and the drive gear, which is detected by the detection unit, becomes a predetermined value or smaller.

9. A camera optical system according to claim 8, wherein the control unit drives the drive unit so as to rotate the drive gear based on a macro control signal concerning macro shooting from a macro shooting controller for delivering the macro control signal, thereby moving the lens holding frame in the optical axis direction so that the macro shooting is performed.

10. A camera optical system according to claim 9, wherein the first gear does not rotate when the drive unit is being driven so as to rotate the drive gear based on the macro control signal.

11. A camera optical system according to claim 10, wherein the control unit drives the drive unit so as to rotate the drive gear based on a control signal concerning finishing of the macro shooting, thereby resetting the lens holding frame to a position after the flange back adjustment.

12. An image pickup apparatus comprising the camera optical system according to claim 7.

* * * * *